J. F. WEBB.
FILTERING APPARATUS FOR USE IN CONNECTION WITH THE WASHING OF SLIMES AND FOR OTHER SIMILAR PURPOSES.
APPLICATION FILED APR. 12, 1909.
968,720.
Patented Aug. 30, 1910.
2 SHEETS—SHEET 1.
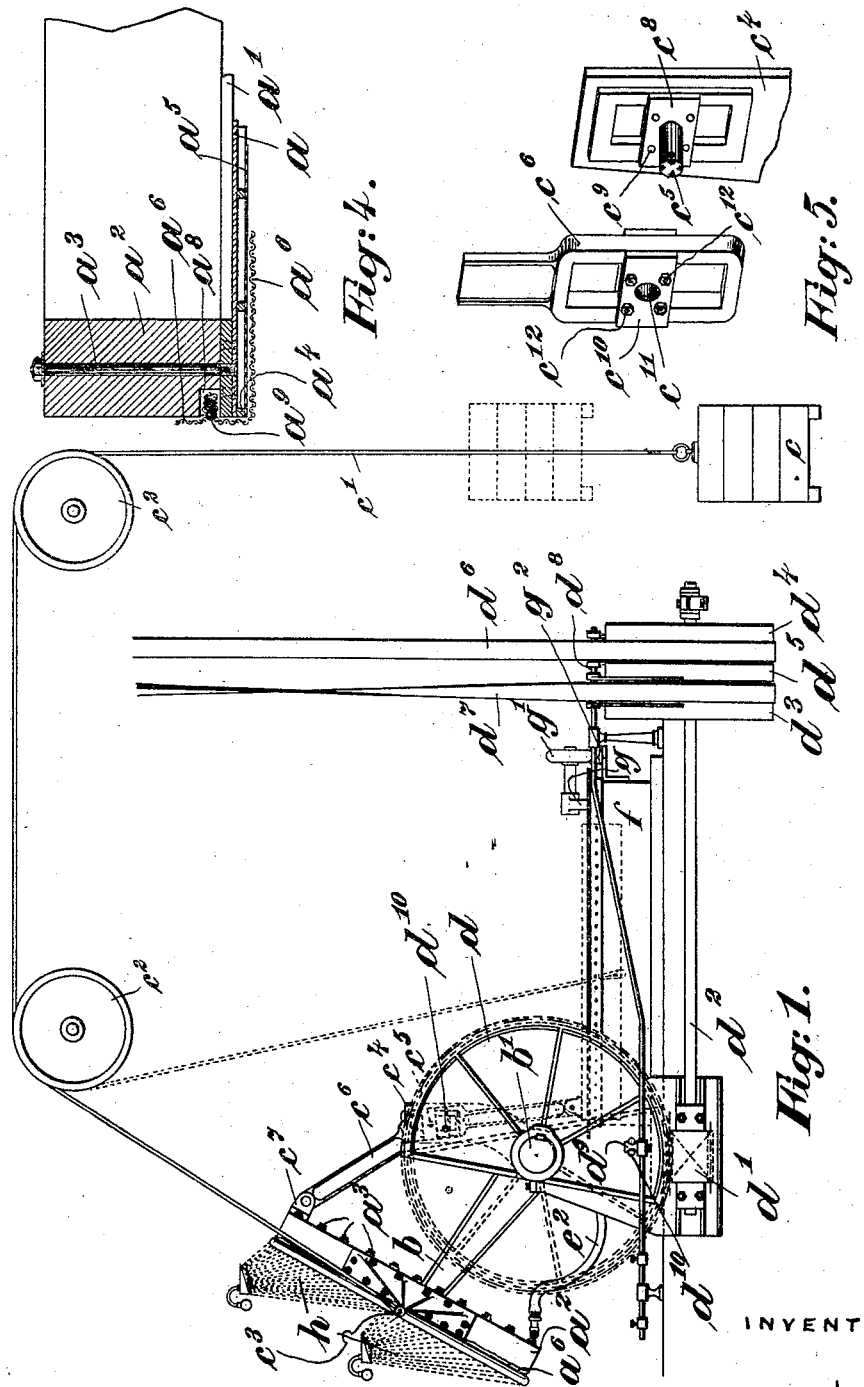
WITNESSES
W. P. Burke
John A. Percival.
INVENTOR
John Frederick Webb
By Wallace White
ATT'Y

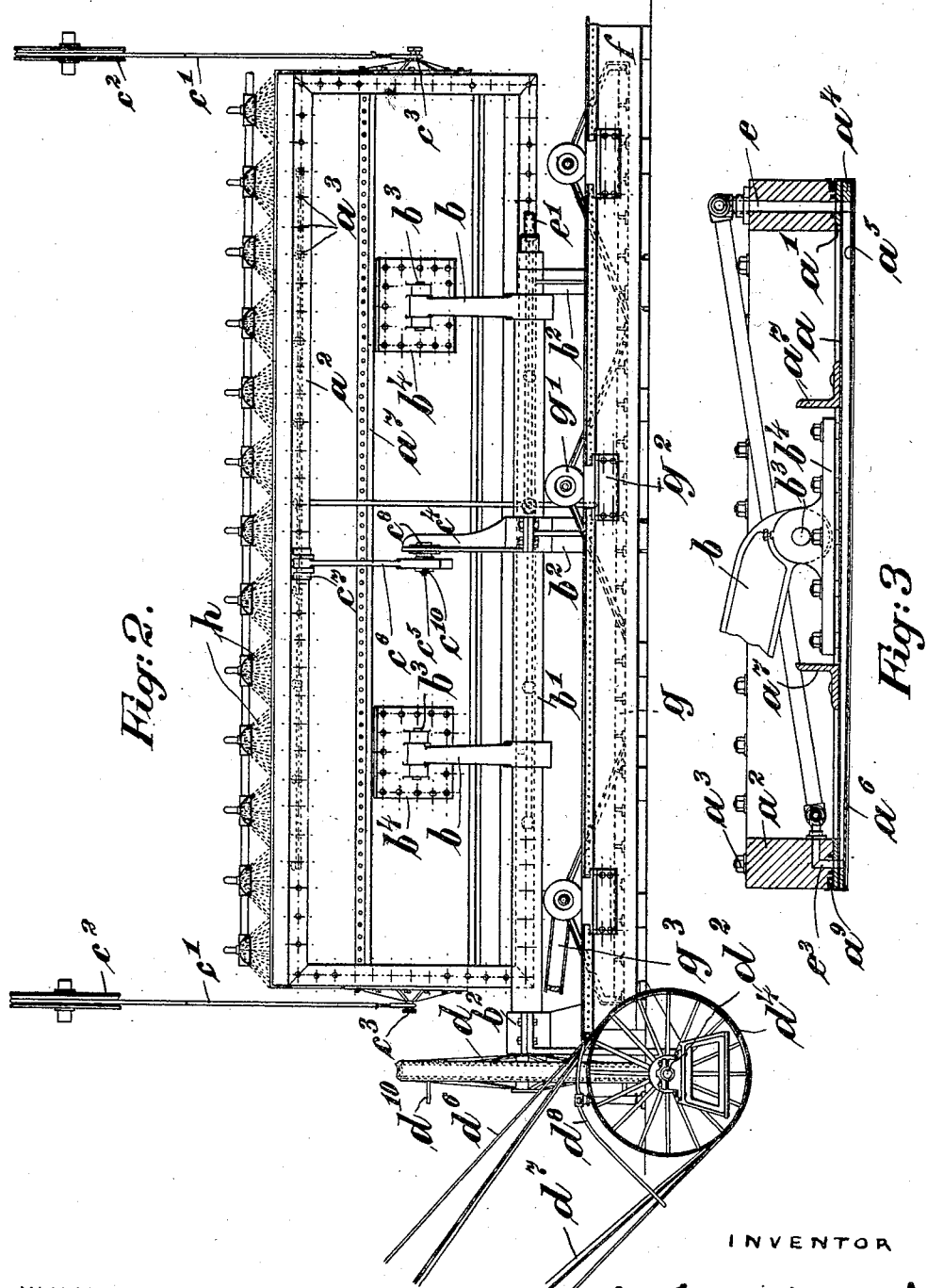

UNITED STATES PATENT OFFICE.

JOHN FREDERICK WEBB, OF BATTERSEA, LONDON, ENGLAND, ASSIGNOR TO HIMSELF, AND PERCY TARBUTT, OF LONDON, ENGLAND.

FILTERING APPARATUS FOR USE IN CONNECTION WITH THE WASHING OF SLIMES AND FOR OTHER SIMILAR PURPOSES.

968,720.                Specification of Letters Patent.     Patented Aug. 30, 1910.

Application filed April 12, 1909.   Serial No. 489,398.

*To all whom it may concern:*

Be it known that I, JOHN FREDERICK WEBB, a subject of Great Britain and Ireland, residing at 20 Louvaine road, Spencer Park, Battersea, in the county of London, England, have invented new and useful Improvements in Filtering Apparatus for Use in Connection with the Washing of Slimes and for other Similar Purposes, of which the following is a specification.

This invention relates to filtering apparatus for use in connection with the washing of slimes and for other similar purposes, and has for its object the construction and arrangement of mechanism whereby the above purpose can be carried out with celerity and efficiency and at a moderate capital expenditure.

In order that the invention may be the better understood I will now proceed to describe the same in relation to the accompanying drawings, reference being had to the letters and figures marked thereon.

Like letters refer to like parts in the various figures.

Figure 1 is an end elevation of a machine made in accordance with my invention, the filtering element being shown in full lines in its raised position for receiving the wash water and discharging the solid residue, and in dotted lines in the tank ready for receiving the slime. Fig. 2 is a side elevation of the same. Fig. 3 is a detail sectional view of the filtering element showing the pipe connections. Fig. 4 is a sectional view of a part of the filtering element showing the method of holding the filtering cloth in position. Fig. 5 shows detail views of the adjustable pivoting device for controlling the movement of the filtering element.

The filtering element consists of a metal plate $a$ having a stiffening bar $a^1$ riveted all around the edge thereof and supported on a wooden frame $a^2$ by means of bolts $a^3$. Upon the metal plate $a$ are arranged distance pieces $a^4$ on which is supported a perforated plate $a^5$ to form a sustaining support for the filtering cloth $a^6$. Angle iron stiffeners $a^7$ are riveted to the back side of the plate $a$ to support the same longitudinally.

The filtering element is pivotally carried on arms $b$ rigidly mounted on a shaft $b^1$ carried in bearings $b^2$, the filtering element being pivoted on pins $b^3$ passing through lugs on the support $b^4$. The weight of the filtering element is counter-balanced to a more or less extent by counter weights $c$ carried at the ends of the ropes $c^1$ passing over pulleys $c^2$ and attached to trunnions $c^3$ carried at the ends of the filtering element. On the center bearing $b^2$ is mounted a bracket $c^4$ which adjustably carries the pin $c^5$ on to which is pivoted one end of the connecting rod $c^6$, while the other end of the connecting rod is pivoted to a bracket $c^7$ attached to the frame $a^2$ of the filtering element. The bracket $c^4$ is slotted, and slidingly carries a block $c^8$ in which is mounted the pin $c^5$, the position of the block $c^8$ in the slot being maintained after adjustment by jamming screws $c^9$. A similar arrangement is provided at one end of the connecting rod $c^6$, the block $c^{10}$ in this case being provided with a hole $c^{11}$ so as to journal on the pin $c^5$ the position of the block $c^{10}$ in the slot in the connecting rod $c^6$ being maintained after adjustment by jamming bolts $c^{12}$.

The operating gear consists of a worm sector $d$ fixedly mounted upon the shaft $b^1$ into which engages the worm $d^1$ carried on the shaft $d^2$, the latter having loose pulleys $d^3$ and $d^4$ and a fast pulley $d^5$, provided at the outer end, on which run belts $d^6$ and $d^7$. The belts are controlled by striking gear $d^8$ of the usual pattern automatically operated at the end of each stroke by means of a projecting finger $d^9$ adapted to co-act with pins $d^{10}$ carried by the sector $d$, so as to remove the operative belt from the fast pulley $d^5$ to one of the loose pulleys $d^3$ or $d^4$ at each end of the stroke, in order to bring the filtering element to rest at the extreme ends of movement.

The filtering cloth $a^6$ is carried around the edges of the filtering element and disposed in a groove $a^8$ where it is maintained in place by elastic packing $a^9$ or in any other suitable manner. The liquid drawn through the filtering cloth $a^6$ passes through the perforated plate $a^5$ into the space between said plate $a^5$ and the plate $a$, and drains away by means of pipes $e$ connected to the pipe $e^1$ passing along the center of the shaft $b^1$ by means of a flexible pipe $e^2$, vent or balance pipes $e^3$ connected with the upper part of the filtering element as shown in full lines in Fig. 1, being coupled up with the pipes $e$ so as to insure the liquid being drained away, preventing any water logging behind the filter cloth $a^6$.

On the lower part of the machine a shallow tank $f$ is disposed for containing the material for treatment, into which the filtering element is lowered into a horizontal position ready to receive the solid residue on the outer surface of the filter cloth $a^6$.

In order to maintain the solid and liquid constituents of the material under treatment thoroughly mixed, a reciprocating agitator $g$ is disposed along the bottom of the tank $f$ and is carried on rollers $g^1$ adapted to run on brackets $g^2$ carried on the sides of the tank $f$ and to be reciprocated by any suitable means such as a crank or eccentric motion device driving a connecting rod $g^3$ from any suitable source of motion.

The pipe $e^1$ is connected to any exhausting means such as a vacuum pump which will tend to draw the liquid through the filter cloth from the tank and the solid residue on to the surface of the filter cloth.

In order to wash the solid residue before discharging it from the filter cloth, water sprays $h$ are provided which deliver water on to the caked solid residue.

The operation of the machine is as follows:—The filtering element is first lowered into the tank $f$ as shown in dotted lines in Fig. 1 and the exhausting means and the agitator are put into operation. When a sufficient amount of solid residue has been collected, the filtering element is raised, inverted and is finally brought to rest automatically in an angular position as shown in full lines in Fig. 1. The water sprays are then turned on until the solid residue is sufficiently washed, when both the water sprays and exhausting means are shut off. As soon as the pressure is equalized on both sides of the solid residue it can be removed from the filter cloth. The belt striking gear is then operated by the attendant when the filtering element returns to the tank and automatically stops in a horizontal position, ready to receive a fresh charge of solid material.

Having now particularly described and ascertained the nature of my said invention and in what manner the same is to be performed, I declare that what I claim is:

1. A filtering apparatus comprising a tank, a filtering element, rotary means on which the filtering element is pivoted, and means for guiding the filtering element so that it is horizontally disposed face downward in the tank, and is held inverted at its position of rest out of the tank.

2. A filtering apparatus comprising a tank, a rotary shaft, arms on said shaft, a filtering element pivotally mounted on said arms, a bridle rod connected to said element at one end, a fixed pivot connected to the other end of said rod, and means for rotating said shaft.

3. A filtering apparatus comprising a tank, a rotary shaft located above the tank, arms on said shaft, a filtering element pivoted to said arms, a bracket carrying a fixed pivot, a rod connected to the filtering element at one end and having its other end connected to the fixed pivot, means for adjusting the connection of the rod with the pivot, and means for rotating the shaft.

In witness whereof I have hereunto set my hand in presence of two witnesses.

JOHN FREDERICK WEBB.

Witnesses:
RICHARD A. HOFFMANN,
ALFRED NUTTING.